E. EMMERT.
Corn-Planter.
No. 211,559.  Patented Jan. 21, 1879.
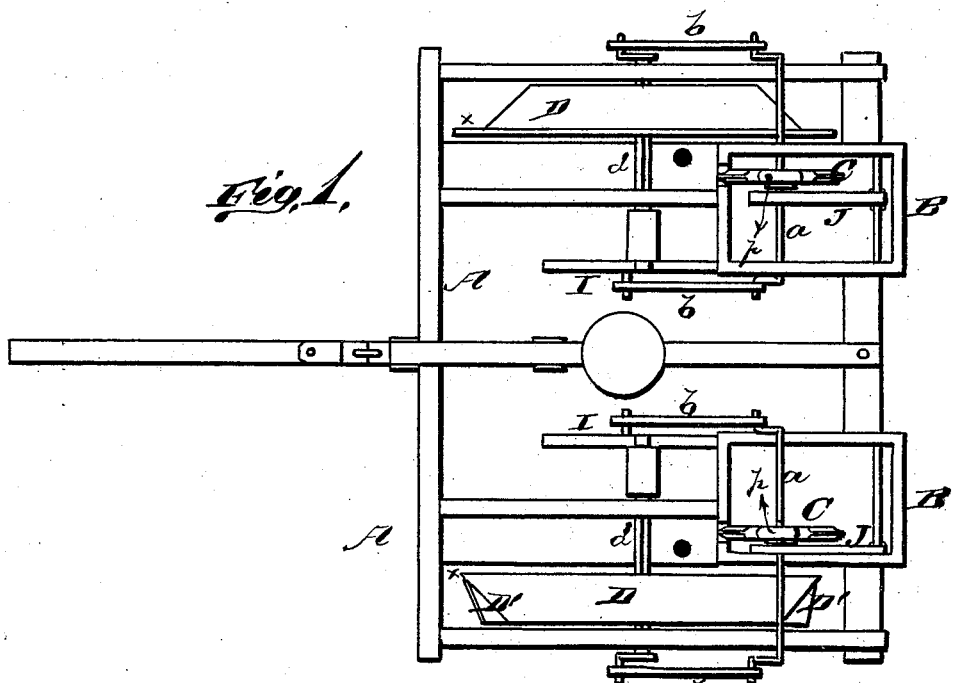
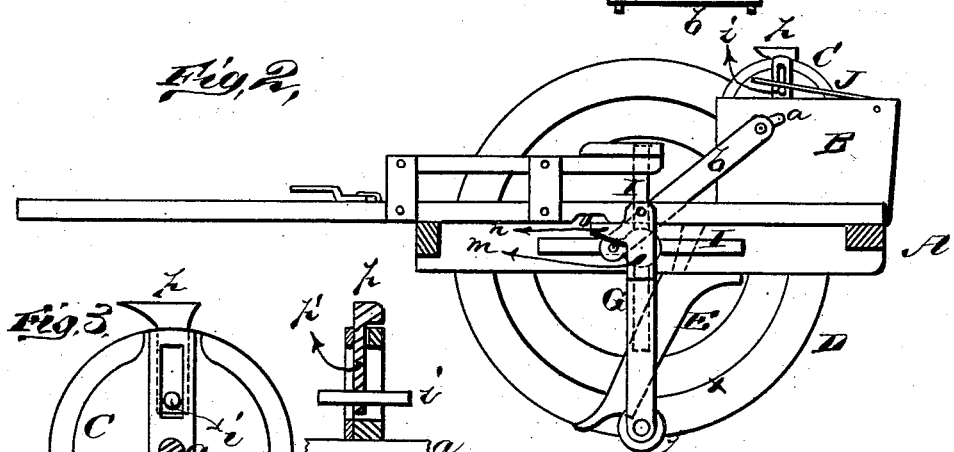
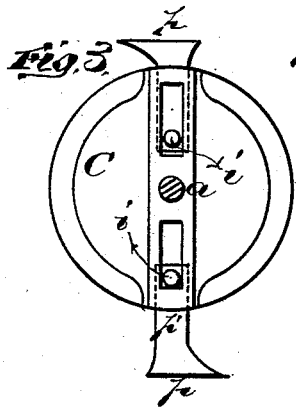
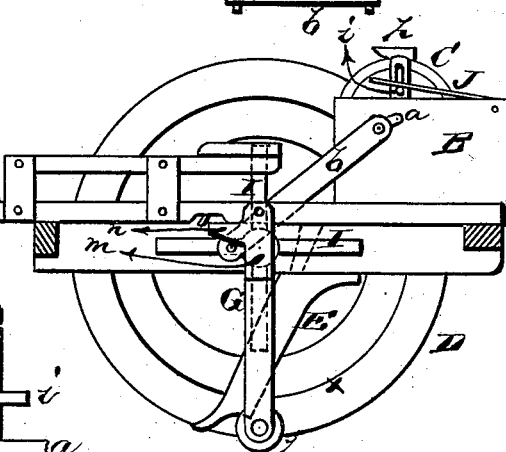
WITNESSES
INVENTOR.
Ezra Emmert
Gilmore, Smith & Co.
ATTORNEYS.

UNITED STATES PATENT OFFICE.

EZRA EMMERT, OF FRANKLIN GROVE, ILLINOIS.

IMPROVEMENT IN CORN-PLANTERS.

Specification forming part of Letters Patent No. 211,559, dated January 21, 1879; application filed September 15, 1877.

*To all whom it may concern:*

Be it known that I, EZRA EMMERT, of Franklin Grove, in the county of Lee and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my corn-planter. Fig. 2 is a longitudinal vertical sectional view of my corn-planter, and Figs. 3, 4, and 5 are details thereof.

The nature of my invention consists in the construction and arrangement of a corn-planter, as will be hereinafter more fully set forth.

The annexed drawings, to which reference is made, fully illustrate my invention.

A represents the frame of my corn-planter, constructed in any suitable manner to contain the various working parts. On the rear portion of this frame are the hoppers or corn-boxes B B.

Each box or hopper B is provided with a dropping-wheel, C, secured upon a shaft, $a$, which has a crank at each end, said cranks being, by pitmen $b\ b$, connected with cranks upon the ends of an axle, $d$. Upon each axle $d$ is secured a dish-shaped wheel, D, which wheels form the driving-wheels of the planter, and also act for other purposes, as will be presently described.

It will be noticed that each wheel D is formed with a flange, $x$, near the edge.

E E represent the plow or teeth, secured under the frame against the inner sides of the wheels D D. The point of each plow or tooth is so placed that the flange $x$ of the wheel will extend out farther than said point of the plow, which will effectually prevent any stubble or stalks from collecting on the point of the plow, and also prevent anything getting in between the point and the wheel.

The planter is intended to plant in check-rows without first marking off the ground, for which purpose each wheel D is provided with two markers, D' D', which will leave a mark on the ground four feet apart.

The plows E, on their outer sides, or on the sides next to the wheels, may be provided with valves, which are to be opened by suitable cams on the wheels at the proper times to drop the corn into the ground, it being understood that the corn has first been deposited into the hollow plow and held there by the valve until the cam opens said valve and allows the corn to drop into the furrow.

Should there be any variation in the turning of the wheels or any variation of the marks on the ground, the machine is backed by the team, which throws the wheels D out of the ground, and throws the weight of the machine upon a center roller, $h$, when the wheels D can be turned to their proper places by means of short handles or levers I I, attached to the inner ends of the axles $d\ d$.

The roller $h$ is mounted in the lower end of an arm, G, which is hung under the center cross-bar of the frame by means of metallic ears or plates $m$, said plates being provided with forwardly-extending arms $n$.

When the machine moves forward the arm G drags with the roller $h$ loosely on the ground; but as soon as the machine is backed the arm G turns forward until stopped by the arms $n$, when the entire weight of the planter will be upon said roller $h$. This roller also enables the machine to be turned easily.

Each dropping-wheel C is provided with two cups, $p\ p$, on the outside or periphery, which cups open and close. When these cups pass through the corn in the boxes B they open. When they come to the surface of the corn in the box each cup is closed in succession by means of an arm, J, pivoted at one end, and extending forward alongside the wheel, the end of said arm resting upon the shaft $a$.

Each cup is formed with an arm, $p'$, extending radially into the wheel, and through said arm is passed a pin, $i$. As soon as the cup leaves the corn or comes to the surface the pivoted arm J bears on said pin $i$, closing the cup and preventing the corn from falling out. When the arm J leaves the pin $i$ a suitable cam is to open the cup, so that the corn will fall out and be conveyed through a suitable conductor to the top of the plow.

What I claim as new, and desire to secure by Letters Patent, is—

1. In a corn-planter, the dish-shaped wheels D, in combination with the hollow plows E E, the points of which are placed inside of the edges of the dishes of the wheels, substantially as and for the purposes set forth.

2. In combination with a corn-planter mounted upon wheels, the hinged arm G, carrying at its lower end the roller $h$, and provided at or near the top with the forwardly-projecting stop $n$, substantially as and for the purposes set forth.

In testimony that I claim the above I have hereunto subscribed my name in the presence of two witnesses.

EZRA EMMERT.

Witnesses:
 JAMES J. SHEEHY,
 GEORGE E. UPHAM.